Feb. 10, 1953  YAO T. LI  2,627,749
DIAPHRAGM TYPE PRESSURE INDICATOR
Filed Oct. 8, 1949
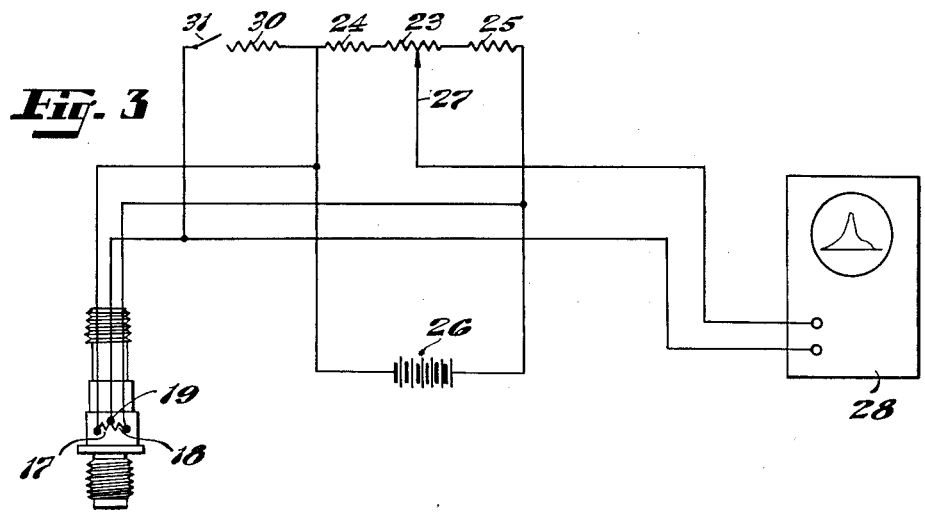
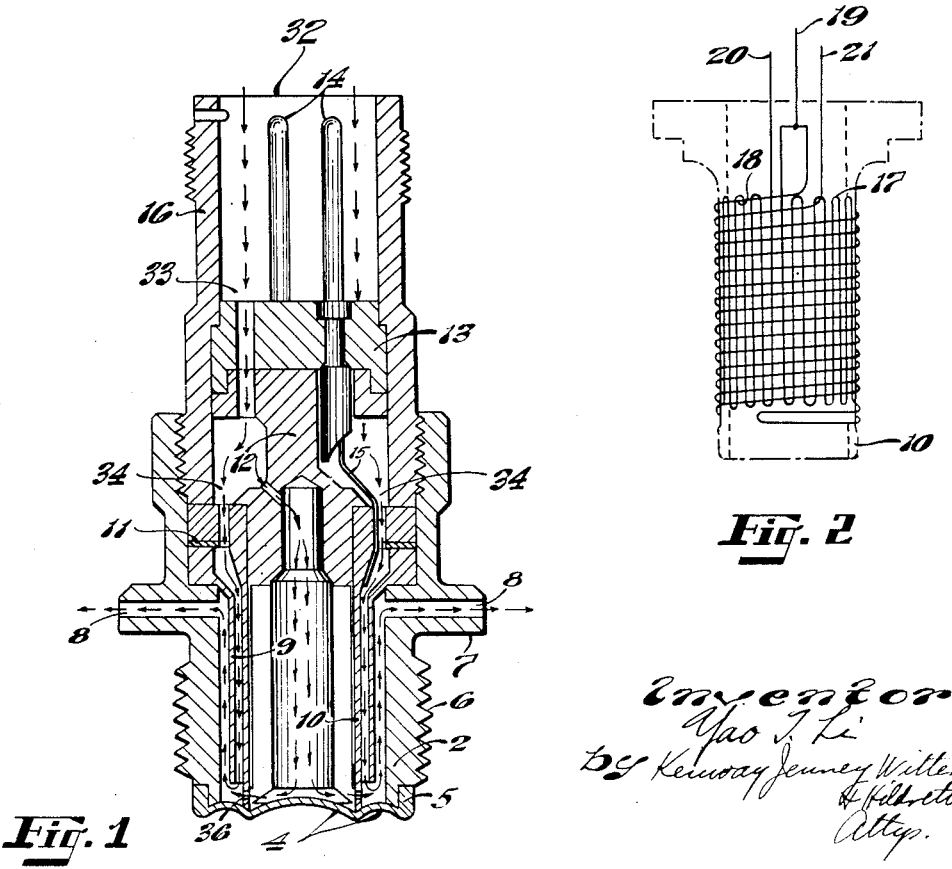
Inventor
Yao T. Li
By Kenway Jenney Witter
& Hildreth
Attys.

UNITED STATES PATENT OFFICE 2,627,749

DIAPHRAGM TYPE PRESSURE INDICATOR

Yao T. Li, Allston, Mass., assignor to Research Corporation, New York, N. Y., a corporation of New York Application October 8, 1949, Serial No. 120,316

4 Claims. (Cl. 73—398)

The present invention relates to pressure indicators, and more particularly to indicators for producing continuous pressure records. The invention is especially concerned with apparatus for accurately recording pressures under the high-temperature conditions existing in internal combustion engines.

One form of indicator that has been used for pressure recording comprises a hollow member adapted to be screwed into an opening in the engine cylinder wall. A flat metal plate flush with the cylinder wall seals the cylinder from the interior of the indicator and also serves as a diaphragm which deflects under pressure. The deflections of the diaphragm are translated into electrical variations, for which purpose either a coil or a condenser plate may be directly associated with the diaphragm, within the cavity of the indicator.

This construction has certain inherent disadvantages, due to the necessity of using a fairly heavy metal plate for the diaphragm. This necessity arises not only from the fact that the diaphragm is called upon to seal against the pressure, but also because it is obliged to provide the entire elastic restraint against the pressure. The joint between the diaphragm and the side wall of the indicator must withstand the entire force bearing upon the diaphragm. With the pressure going as high as 1500 p. s. i., a very high shear force is present at the circumference, and a very high bending moment is developed at the center of the diaphragm. In order to withstand these pressures, the diaphragm must be made of heavy gauge metal.

Another factor requiring a heavy diaphragm is that the natural frequency of the diaphragm must be considerably higher than the frequencies of the pressure vibrations to be measured. The pressure vibrations within an engine cylinder may run as high as 10,000 C. P. S.; hence the diaphragm should have a natural frequency of 40,000 C. P. S. or higher. This requires the use of a heavy diaphragm (.040" or more thick), since the natural frequency of a flat diaphragm is proportional to its thickness.

However, a heavy diaphragm necessarily has a low sensitivity, since it is capable of yielding but slightly when pressure is applied to it. Hence only small deflections of the diaphragm can be obtained, and the apparatus therefore requires exceptionally sensitive amplifying equipment.

The flat diaphragm is also particularly liable to be influenced by certain sources of error. Changes in the average temperature of the diaphragm, such as occur when the engine is in operation, modify the elastic constants of the diaphragm, and so alter its sensitivity. A temperature gradient through the diaphragm causes it to bend toward the side of higher temperature. Vibrations of the cylinder walls set up vibrations in the diaphragm itself, affecting the pressure readings.

The chief object of the present invention is to provide a pressure receiver of high sensitivity and low susceptibility to such sources of error as exist under operating conditions.

With this object in view, the principal feature of the invention comprises the combination of a thin diaphragm and an internal supporting tube, the diaphragm being constructed only to seal against the engine pressure and to transmit the pressure to the tube. The tube constitutes the principal source of elastic restraint against the pressure. The natural frequency is that of the diaphragm and tube combination. The diaphragm is preferably of a rippled or dished construction. The effect of pressure on the diaphragm is to distort the tube both longitudinally and circumferentially; and suitable electrical means, preferably in the form of strain gages, are provided to translate the tube distortions into electrical variations. Another feature is a compensating strain gage arrangement which eliminates the effects of changes in temperature.

In the accompanying drawings, Fig. 1 is a sectional elevation of a pressure indicator according to the present invention; Fig. 2 is an elevation of the tube and strain gage windings; Fig. 3 is a diagram of an electrical circuit.

In Fig. 1 the shell 2 has a cylindrical passage closed at one end by a thin metal diaphragm 4, which is fixed to the end of the shell by a force fit and silver solder joint 5. In the preferred form the diaphragm has a concave portion in the middle, and a concave annulus around the edge, the two concave portions being separated by a circular ridge. The shell 2 is provided with screw threads 6, by means of which it is screwed into the wall of the engine cylinder. A flange 7 on the outside of the shell has a number of openings 8 extending through it radially to permit the passage of cooling air. Inside the shell is the cooling air guide tube 9, and inside this tube is a strain generating tube 10, the end of which fits into the circular ridge of the diaphragm. A spacer 11 is inserted between the flanges of the cooling air guide tube 9 and the strain generating tube 10 to bring the latter tube properly into position against the diaphragm.

A member 12 fits into the strain generating tube and links it with the connector 13, which bears the prongs 14. The leads 15 from the strain gage windings, which will be hereafter described, attach to the prongs 14, by means of which external electric connections are made. The connector, strain generating tube and cooling air guide tube are held in place by a connector sleeve 16.

Fig. 2 shows the strain gage windings on the strain generating tube 10. The longitudinal winding 17 runs parallel to the axis of the tube in loops equally spaced around its circumference. The circumferential winding 18 runs in a double spiral around the tube. One end of the circumferential winding is connected to one end of the longitudinal winding, and a lead 19 is taken from this junction. The other leads 20, 21 come from the free ends of the two windings.

When pressure is applied to the diaphragm 4, it is transmitted to the strain generating tube 10. This causes a longitudinal compression and a circumferential expansion of the tube. The longitudinal winding 17 is therefore compressed, and has its resistance reduced. The circumferential winding 18 is placed in tension and has its resistance increased. These resistance changes are used to measure the pressure, as will be hereafter described.

Fig. 3 shows the electrical circuit used to record the changes in winding resistance. The windings 17, 18 form two arms of a bridge circuit. Resistors 23, 24 and 25 form the third and fourth arms. The voltage source 26 is connected to two diagonal corners of the bridge across the strain gage windings. The other two corners, including the center lead 19 of the strain gage and the center tap 27 of resistor 23 are connected to the amplifying and recording system 28. Zero balance of the output signal of the bridge is achieved by adjusting the position of the center tap 27 along resistor 23. The resistors 30 and the switch 31 are used to calibrate the apparatus.

Variations in the resistance of the windings cause the voltage input to the amplifying system 28 to vary. The bridge type of connection causes the resistance variations of the strain gage to reinforce one another in their effect upon the voltage input. Thus the circuit is more sensitive than it would be if only one of these windings were used.

The small arrows in Fig. 1 indicate the path followed by cooling air, which is used to keep the temperature of the strain gage windings and the strain generating tube from becoming excessive. Compressed air enters the indicator at 32, and passes through openings 33 in the connector 13, and openings 34 in the member 12. It is then guided along the surface of the strain generating tube 10 by the cooling air guide tube 9, and exits through the openings 8. Since the strain generating tube and the strain gage windings are remote from and not directly heated by the engine gases, the cooling operation can be effectively and uniformly carried out. Another branch of cooling air is directed through the center core of member 12 to cool the inside surfaces of the diaphragm and is discharged through the holes 36 drilled at the lower end of the strain generating tube 10.

The present invention has many advantages over the flat diaphragm system described earlier. The greatest advantage arises from the fact that a much thinner diaphragm can be used. Since the diaphragm is supported by the strain generating tube, it need not be strong enough to resist, by itself, the pressure in the engine cylinder. Furthermore, the natural frequency of the system depends mainly on the characteristics of the strain generating tube, not on the diaphragm. It has therefore been found practicable to use a diaphragm as thin as .005″ for internal combustion engine purpose, as compared with the .040″ thickness necessary with the flat diaphragm.

The difference in thickness makes the present invention much more sensitive to pressure than the flat diaphragm system. Tests have shown that the apparatus of the present invention undergoes a deflection four or five times as great as that obtained with a conventional system under the same applied pressure.

The dished or rippled form of the diaphragm is of considerable importance. The effect of pressure is to place a uniform load over the diaphragm surface, thereby stressing the diaphragm in tension. If the diaphragm were originally flat, the stresses in the diaphragm would be very large, as can be readily seen from a force diagram. The diaphragm may be termed a catenary diaphragm, since its appearance in section is similar to that of the cables of a suspension bridge, for which the stress analysis is quite similar. It will be understood that the formation in exact catenary shape is not necessary, and that the dished form is made by conventional spinning or pressing methods.

The system of the present invention is less susceptible than a flat diaphragm system to the sources of error usually encountered in operation. Almost the entire resistance to the pressure is afforded by the strain generating tube; the diaphragm is so highly flexible that it contributes very little thereto. Hence a change in the average temperature of the diaphragm causes no appreciable error in the deflection of the pressure receiver. Similarly, any error due to temperature gradient through the diaphragm is negligible, because the lightness of the diaphragm permits it to exert only a slight stress on the strain generating tube.

The apparatus of the present invention is also less sensitive than previous systems to vibrations of the cylinder walls. This is due to the much greater sensitivity to pressure of the apparatus of the present invention. A given pressure produces a much greater deflection in this apparatus than it does in the flat diaphragm system. Conversely, the same deflection due to vibration produces a much smaller pressure reading in the apparatus of the present invention than in the flat diaphragm system.

Changes in the temperature of the strain gage windings have no effect on the pressure readings. Because both windings are bound intimately to the strain generating tube, they both have the same temperature; hence any temperature changes affect the resistances of the two windings equally. As a result, no potential change occurs at the output terminal (i. e., the common lead of the two windings) because of changes in winding temperature.

Because of the manner in which the strain gage windings are arranged, changes in the temperature of the strain generating tube do not affect the sensitivity of the apparatus. With only the longitudinal winding on the tube, the apparatus would be more sensitive at the higher temperatures, because of the variation in the modulus of elasticity of the tube metal. But as long as the temperature of the tube stays below approximately 175° F., the changes in Poisson's ratio cause the circumferential winding to experience an opposite effect. The two effects approximately balance each other; and as a result, the sensitivity is very nearly independent of the temperature. The cooling system shown in Fig. 1 keeps the temperature within the required limit.

The invention is not limited to the precise construction herein shown and described. The principal feature is the combination of a thin flexible diaphragm and a supporting tube, the diaphragm serving mainly to seal against the pressure and to transmit the pressure to the tube. The dynamic characteristics of the apparatus are primarily those of the tube itself. The distortions of the tube may be converted to electrical vibrations by any suitable electro-mechanical transducer, as for example, piezo-electric crystals, but the strain gage transducer is preferred because of its simplicity and also because it responds to static values.

Having thus described the invention, I claim:

1. In a pressure indicator, a thin flexible diaphragm having a dished central portion and a dished annular portion connected by a circular ridge, a support for the diaphragm at the periphery thereof, a tube having its end seated in said ridge, and a pressure-responsive member actuated by the tube.

2. In a pressure indicator, a thin flexible diaphragm having a dished central portion and a dished annular portion connected by a circular ridge, a support for the diaphragm at the periphery thereof, a tube having its end seated in said ridge, a pressure-responsive member actuated by the tube, and internal cooling means for directing cool gases over the tube.

3. In a pressure indicator, the combination of a thin flexible diaphragm, means for sealing the diaphragm at its edge, a supporting tube engaging the diaphragm near its center, the diaphragm being concave in its central portion and also in the annular portion surrounding the tube, the elastic restraint against pressure being afforded substantially entirely by the tube, a strain gage on the tube for converting distortions of the tube into electrical variations, and cooling means for the strain gage and strain generating tube.

4. In a pressure indicator, a thin flexible diaphragm having a dished central portion and a dished annular portion connected by a circular ridge, a support for the diaphragm at the periphery thereof, a tube having its end seated in said ridge, an electrical winding fixed to the tube and having wires extending lengthwise of the tube, a second electrical winding having wires extending in a direction around the tube, the two windings being disposed over substantially the same portion of the tube, and means for detecting variations in the resistances of the two windings.

YAO T. LI.

REFERENCES CITED

The following references are of record in the file of this patent:

UNITED STATES PATENTS

| Number | Name | Date |
|---|---|---|
| 2,400,701 | Meredith | May 21, 1946 |
| 2,420,148 | Ostergren | May 6, 1947 |
| 2,421,907 | Postlewaite | June 10, 1947 |
| 2,472,045 | Gibbons | May 31, 1949 |
| 2,474,146 | Hathaway | June 21, 1949 |
| 2,509,421 | Carter | May 30, 1950 |

OTHER REFERENCES

Publication: A new High Performance Engine Indicator of the Strain Gage Type—C. E. Draper and Y. T. Li.